United States Patent [19]

Cazenave et al.

[11] Patent Number: 4,758,393

[45] Date of Patent: Jul. 19, 1988

[54] PROCESS FOR CASTING ELEMENTS IN REINFORCED CONCRETE

[75] Inventors: Claude Cazenave, Fourqueux; Maurice Decubber, Beaumont S. Oise, both of France

[73] Assignee: Societe Anonyme de Traverses en Beton Arme Systeme Vagneux, Paris, France

[21] Appl. No.: 946,125

[22] Filed: Dec. 23, 1986

Related U.S. Application Data

[63] Continuation of Ser. No. 762,798, Aug. 2, 1985, abandoned, which is a continuation of Ser. No. 454,664, Dec. 30, 1982, abandoned.

[30] Foreign Application Priority Data

Jan. 21, 1982 [FR] France ................................ 82 0086

[51] Int. Cl.⁴ .......................... B28B 1/08; B28B 7/08; B28B 23/06; B29C 67/12

[52] U.S. Cl. ...................................... 264/71; 264/228; 264/229; 264/297.9; 264/DIG. 43; 425/111

[58] Field of Search ................ 264/228, 79, 71, 297.9, 264/333, 69, DIG. 43, 229; 425/111

[56] References Cited

U.S. PATENT DOCUMENTS

| | | | |
|---|---|---|---|
| 2,236,107 | 3/1941 | Miller et al. | 264/229 |
| 3,233,027 | 2/1966 | Wennstrom | 425/111 X |
| 3,568,274 | 3/1971 | Hidden et al. | 264/228 |
| 3,666,385 | 5/1972 | Baker | 425/111 |
| 3,810,337 | 5/1974 | Pollard | 264/229 |
| 3,891,731 | 6/1975 | Williams | 264/229 |
| 3,907,951 | 9/1975 | Godley | 264/40 |
| 4,069,283 | 1/1978 | Rauchfuss | 264/32 |
| 4,224,274 | 9/1980 | Ozawa | 264/333 |
| 4,629,408 | 12/1986 | Giron et al. | 264/229 |

FOREIGN PATENT DOCUMENTS

| | | |
|---|---|---|
| 0609527 | 10/1948 | United Kingdom . |
| 0711203 | 6/1954 | United Kingdom . |

*Primary Examiner*—Jan H. Silbaugh
*Assistant Examiner*—Karen D. Kutach
*Attorney, Agent, or Firm*—Ladas & Parry

[57] ABSTRACT

A process for making beams of prestressed concrete in an assembly for casting and curing beams of prestressed reinforced concrete, having an individual prestress frame allowing tensioning of longitudinal reinforcements between two fixed end elements maintained in spaced-apart relationship by longitudinal elements; and an individual impression cooperating hermetically with the frame so that the walls of the impression and the walls of the end elements of the frame, connected together, form the sides of a mould receiving the cast concrete, the impression being adapted to be separated from the frame without detensioning of the reinforcements.

3 Claims, 4 Drawing Sheets

PROCESS FOR CASTING ELEMENTS IN REINFORCED CONCRETE

This is a continuation of application Ser. No. 762,798, filed Aug. 2, 1978 and now abandoned, which is a continuation of application Ser. No. 454,664, filed Dec. 30, 1982, now abandoned.

The present invention relates to an assembly for casting and curing elements of prestressed reinforced concrete, particularly beams, and to a process for manufacturing such elements.

Although reference will be made in the present specification to the casting of beams, it is obvious that this application is in no way limiting, and that the assembly and process of casting according to the invention may be applied to the manufacture of a large variety of elements in prestressed reinforced concrete.

Several known methods for making such beams exist: they may be classified in two categories, according to whether the beams are cast one by one or several at a time.

For individual manufacture, an elaborate mould is conventionally used, which allows positioning of a certain number of rods disposed longitudinally and forming reinforcements for the concrete. These rods are tensioned and embedded in the concrete cast in the mould. The concrete is then dried by curing the mould for a fairly long period of time, of the order of twelve hours. Finally, the armatures are detensioned and the beam is separated from the mould; to effect this separation, it is necessary to cut the reinforcements imprisoned in the concrete, without damaging the mould which also retains them.

U.S. Pat. No. 3,233,027 for example also discloses moulding the beam in a guide element in which slide two mobile wall members corresponding to the two ends of the beam to be moulded. To these two mobile wall members are connected the reinforcements which are tensioned by a jack member placed between the mobile wall members, spacing them apart. The assembly is thus maintained in position until the concrete has dried sufficiently; the guide element may, moreover, be withdrawn as soon as the concrete has set, to facilitate drying. This enables it to be re-used immediately.

In any case, individual manufacture of the beams has, up to the present time, always presented the drawback of necessitating heavy investment: the cost of an individual mould, or of an individual jack, is in fact high and a large number of them must be available, even for reduced rates of production, due to their very slow turnaround: in fact, in one case, curing in the moulds means that they are immobilized for a long period of time; in the other case, it is the jacks which are immobilized during drying, as long as the tension of the reinforcements must be maintained.

It has also been proposed to manufacture a plurality of beams in one operation by disposing them either end to end or side by side.

The first case concerns the so-called "long bed" method, in which very long reinforcements are tensioned and placed inside a single mould likewise of very long length, or, preferably, inside a series of individual moulds aligned end to end. After the concrete has been cast, the assembly is cured in situ (in fact, it is not possible to move it due to its dimensions) and, after drying and withdrawal of the moulds, the single piece obtained is cut into a series of individual beams. Although this solution eliminates some of the drawbacks of the preceding method by enabling several (generally 5 to 10) beams to be made in one operation, it will be readily appreciated that it requires large installations both by their dimensions and by their complexity: manipulation and tensioning of long reinforcements, strict alignment of the individual moulds and positioning with respect to the reinforcements, homogeneous curing in situ, delicate release from mould (the possibility of turning over does not exist, contrary to an individual mould), finally, precise cutting of the beams.

Due to its volume, such an installation (of which a description will be found for example in British Pat. No. 609 527) is justified only in the case of major series of production of long duration, allowing long-term amortization.

In addition any defect in the composition of the concrete is more difficult to correct and has more serious consequences when the beams are manufactured batch by batch than when they are manufactured individually.

Instead of disposing the beams in alignment, they may also be cast side by side, as in the installation described in U.S. Pat. No. 3,666,385: a series of reinforcements are tensioned parallel between two sides of a frame element framing the juxtapoxed individual moulds. Notches made on the small side of the moulds allow passage of the reinforcements.

After the concrete has set, the prestress frame may thus be lifted without detensioning the reinforcements, and it may be turned over to assist drying of the beams thus released from the moulds. The moulds can be quickly recovered.

However, the economic considerations relevant to large-volume installations are the same as before. In addition, one of the main difficulties encountered with this system resides in ensuring perfect tightness at each notch.

As a variant, the use of wheels bearing on their periphery the moulds disposed side by side, oriented axially, has also been proposed.

However, the lack of versatility of the afore-mentioned processes remains.

On the contrary, the invention proposes a new integrated process for casting and final curing, and an assembly adapted to carry out this process, which overcome the afore-mentioned drawbacks.

The assembly for casting and curing comprises an individual prestress frame allowing tensioning of longitudinal reinforcements between two fixed end elements maintained in spaced-apart relationship by longitudinal elements; this frame cooperates hermetically with an individual impression so that the walls of the impression and the walls of the end elements of the frame, connected together, form the sides of a mould receiving the cast concrete, the impression being adapted to be separated from the frame without detensioning of the reinforcements.

To use this assembly, the process consists in: mounting the reinforcements in the bare frame; tensioning these reinforcements; positioning the frame thus prepared on the impression; casting the concrete in the mould constituted by the combination of the frame and of the impression; vibrating and ramming the concrete in the mould; turning the impression over so that the upper face of the mass of concrete rests on a heating slab, for example electrically heated; withdrawing the impression; covering the frame with an insulating cover allowing curing in a closed volume defined by the sides of the frame, the cover and the surface of the heating slab; curing the concrete; detensioning the reinforcements after the concrete has dried; finally, separating the frame and the finished beam.

The impression may thus be recovered immediately and re-used for casting another beam, whilst the first beam begins to dry. Immobilization of the frame for the whole duration of the cycle remains indispensable for maintaining the prestress up to complete drying; however, this element of slow turnaround is an element of lower value. But, in particular, the frame, in addition to its role of maintaining the prestress, performs the function, associated with the cover, of individual oven confining the hot air around the beam, on its exposed faces. The reduced dimensions of the frame (only slightly greater than those of the beam) thus ensure very rapid, high quality curing.

Moreover, only installations of reduced size are required for carrying out the invention, the different operations being hardly more complex than those corresponding to manufacture in individual moulds. The process is therefore particularly well adapted to the implantations made with a view to small or average series: it does not necessitate highly qualified personnel and, apart from the frames and impressions, uses only conventional equipment.

All the possibilities offered by the method of the individual moulds are conserved, particularly the possibility of release from the mould by turning it over, such demoulding being effected on the ground, at any part of the heating slab.

The rate of manufacture is at least equal to that of the processes by batch production, whilst conserving the versatility of individual manufacture.

To enable the assembly according to the invention to perform its role of mould optimally, a hermetic cooperation between the frame and the impression is necessary to avoid any flow of the liquid concrete before it sets. To this end, each end element of the frame is provided, on its inner face, with a boss of which the profile, associated with the inner profile of each longitudinal element, is homologous with the profile of the section of the impression at its end, so that the positioning of the frame on the impression simultaneously ensures relative positioning of these two pieces and seal thereof; the latter is made by simple contact of the homologous surfaces.

The invention will be more readily understood on reading the following description with reference to the accompanying drawings, in which.

Figure 1:
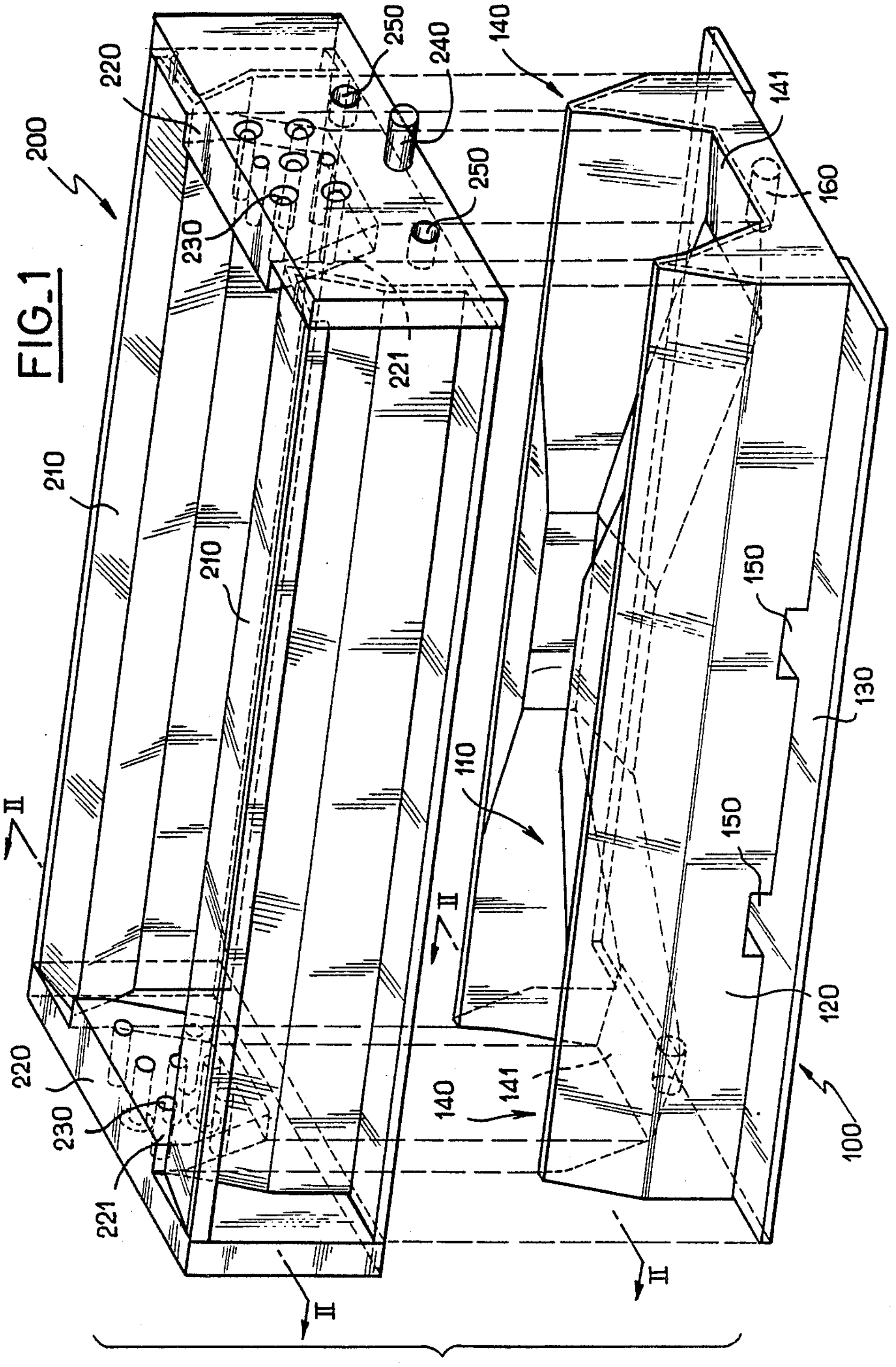
FIG. 1 is a perspective view of the frame and of the impression before they are asembled together.

Referring now to the drawings, FIG. 1 shows the impression 100 and the prestress frame 200, these two elements being separated but superposed opposite each other in a position prior to being assembled together.

The impression 100 has an inner surface 110 forming the mould proper, and of which the shape corresponds to the shape to be given to the beam. This mould proper is reinforced and supported by two lateral walls 120 borne by a base 130. The two ends 140 of the impression are open; they each present an end surface 141 adapted to receive a corresponding element of the frame ensuring hermetic closure of the mould. The impression also comprises, in its lower part, transverse recesses 150 allowing, for example, introduction of the fork of a fork lift truck or other handling apparatus; such handling is also facilitated by the presence of journals such as 160, disposed inside the impression (and therefore only accessible when said impression is turned over and does not rest on its base) in order not to hinder positioning of the prestress frame.

This frame 200 is constituted by two longitudinal elements 210 connecting two end walls 220. These end walls 220 each comprise a series of bores such as 230 (in the example shown, seven of such bores have been provided): the reinforcements (not shown) are placed between the opposite bores of each end wall, and tensioned by means of devices disposed on the outer face of the end walls, such as for example studs for screwing, according to a known technique. The considerable force of tension of the reinforcements, which pull the two end walls towards each other, makes it necessary to provide sufficiently resistant sections 210 to avoid any buckling and twisting of the frame. These sections may for example be adequately dimensioned, standardized U-shaped sections. Each end wall also comprises, for handling the frame, a journal 240 and blind holes 250 disposed on the outer face. Finally, to allow positioning and ensure tightness between the frame and the impression, each end wall is provided, on its inner face, with a boss 221 whose profile is homologous of that of the end surface 141 of the impression.

Figure 2:
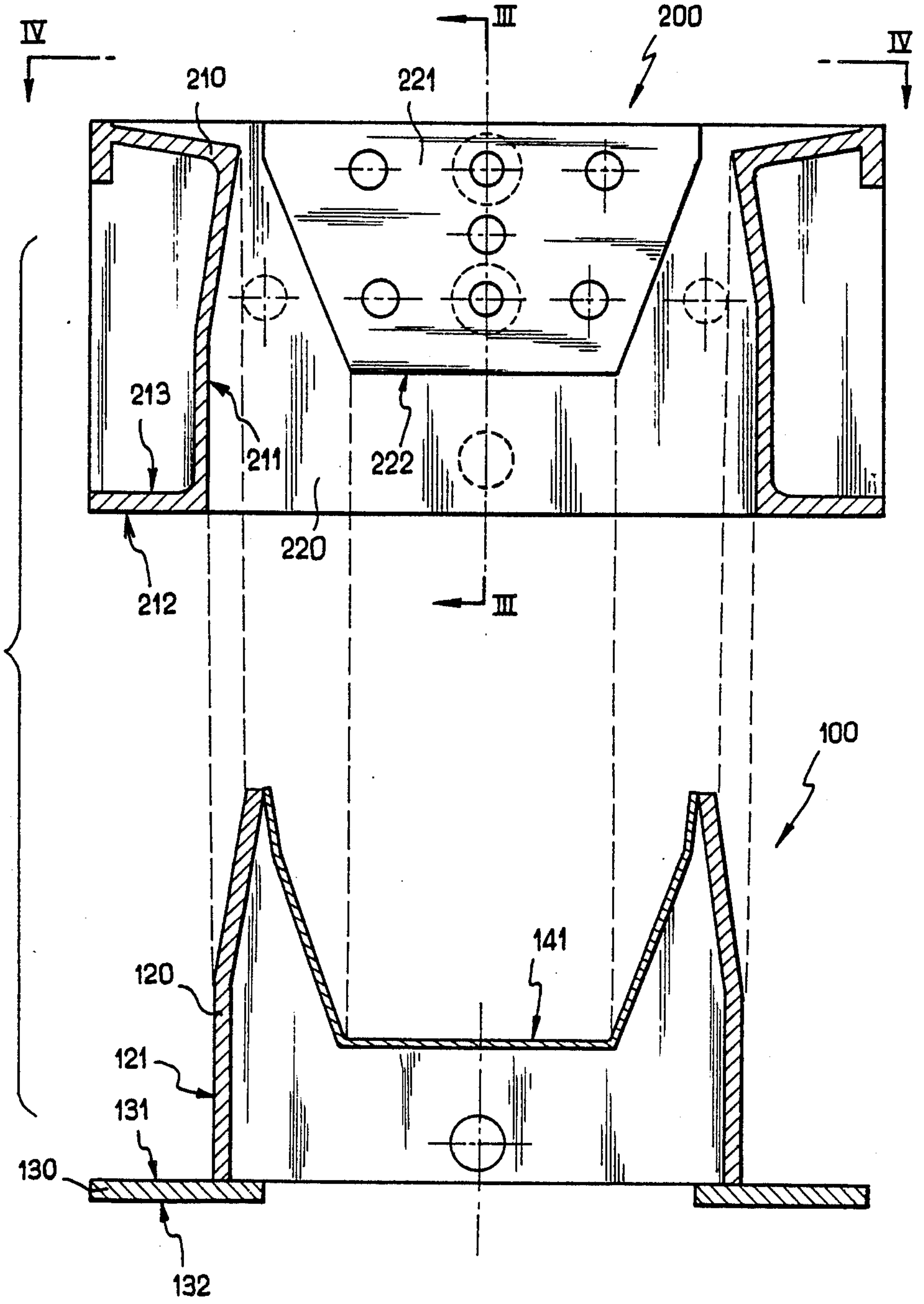
FIG. 2 is an end view of the frame and the impression along line II—II of FIG. 1.

Cooperation of the two elements is more readily explained with reference to FIG. 2 which shows the profile 222 of the boss 221, corresponding to the bottom and to the sides of the end surface 141 of the impression 100. Furthermore, the inner surface 211 of the longitudinal element 210 is homologous of the outer surface 121 of the side wall 120 of the impression, and the lower face 212 of this same longitudinal element corresponds to the upper face 131 of the base 130. In this way, the simple positioning of frame 200 on impression 100 ensures strict positioning of these two elements and tightness of the mould, made simply by contact of the corresponding faces.

To perfect this contact for the whole duration of the concrete casting and ramming operations, when said concrete is still fresh, the frame and the impression are fastened together, for example by means of hydraulic clipping jaws bearing between the upper face 213 of each longitudinal element and the lower face 132 of the base of the impression.

Figure 3:
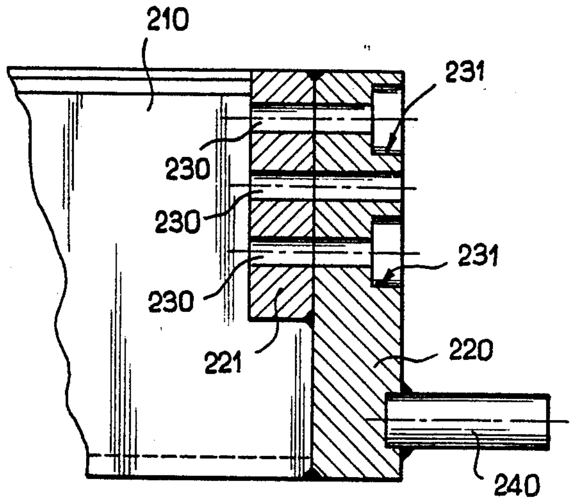
FIG. 3 is an elevation, in section, of an end of the frame, along line III—III of FIG. 2.
Figure 4:
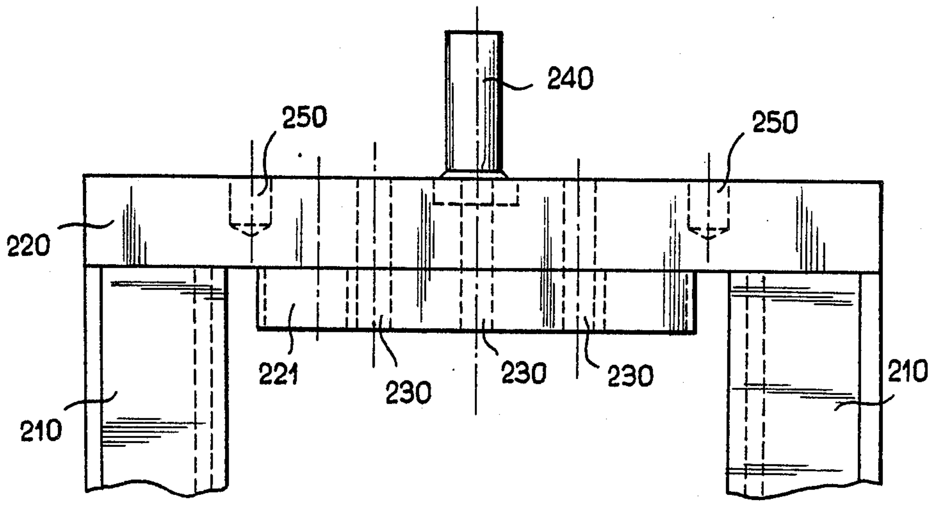
FIG. 4 is a plan view of the same end of the frame, along line IV—IV of FIG. 2.

FIGS. 3 and 4 show the structure of each end wall 220 more precisely. They are rigidly fixed to the ends of the longitudinal elements 210, for example by welding. The end wall 220 and its boss 221 have bores 230 passing therethrough for the passage and tensioning of the reinforcements. Certain of these bores comprise, on the outer face, a facing 231 for concealing the pieces retaining the reinforcements. As may be seen more particularly in FIGS. 1 and 2, the bores provided with a facing on one of the end walls are not provided with facings on the opposite end wall, and vice versa. In this way, the studs for screwing may be distributed on the two end walls and a sufficient space may thus be available around each stud, despite the small space between the axes of the bores.

FIGS. 3 and 4 also show the journal 240 and the blind holes 250 allowing handling. The journals, which are oriented axially, are preferably disposed in the lower part of the end wall, so as to allow the assembly to be turned over, around an axis passing through these journals; to this end, it suffices for this axis to pass below the centre of gravity of the assembly formed by the impression, the frame and the mass of concrete.

Figure 5:
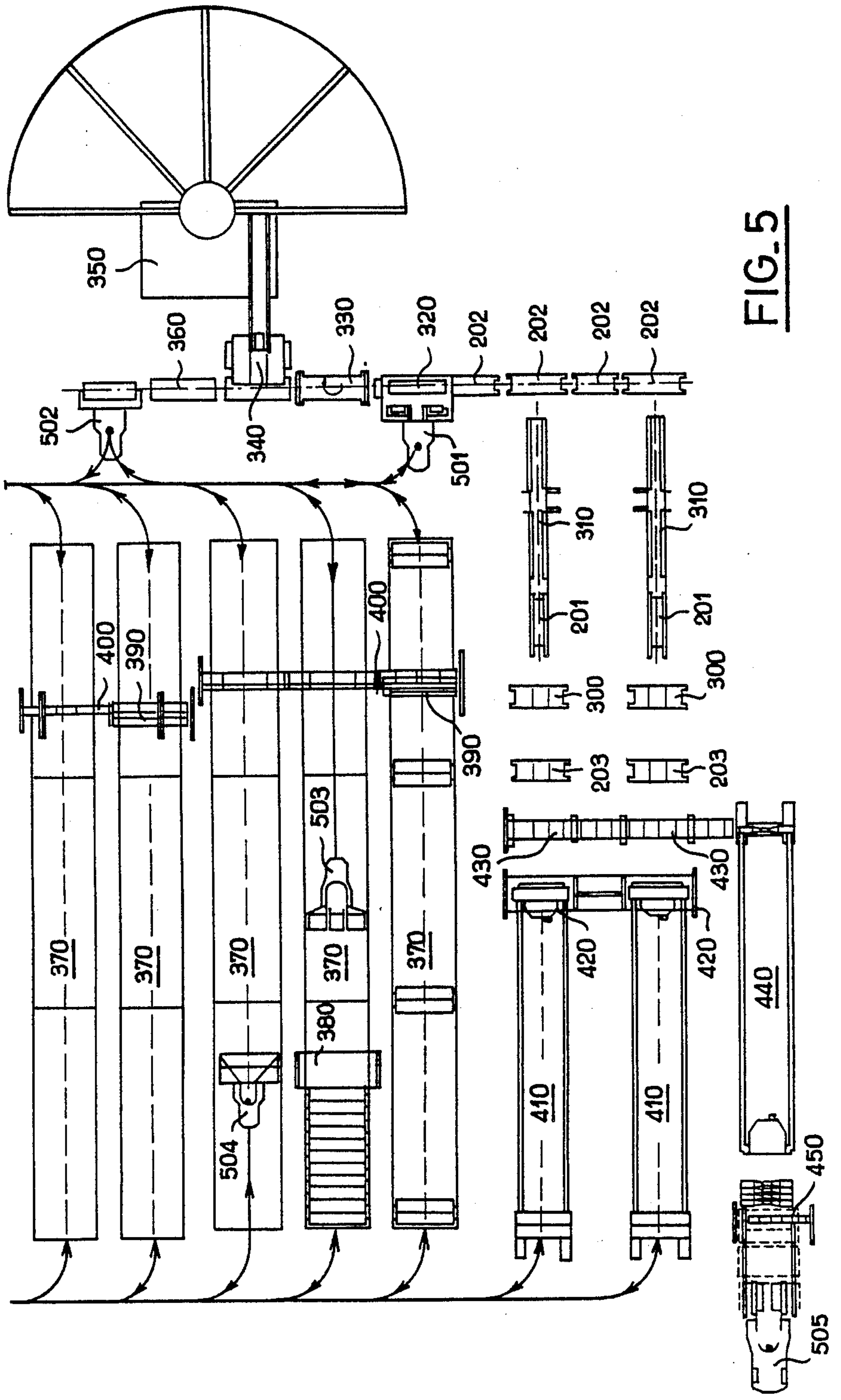
FIG. 5 is a schematic plan view of an installation for carrying out the process according to the invention, showing in particular the circulation of the impressions, frames and beams and the implantation of the different work stations corresponding to each of the steps of the process.

FIG. 5 is a plan of an installation for carrying out the process, which shows, in particular, the circulation of the impressions, the frames and beams, and the implantation of the different stations corresponding to each of the steps of the process. Manufacture of a beam will now be described with reference to this Figure.

The description of this installation is given only by way of illustration of execution of the process, and is in no way limiting; numerous other types of installation may be envisaged for carrying out the process, within the spirit of the invention.

The installation firstly comprises stations for mounting the reinforcements in the frames (for example two, referenced 300 in FIG. 5). At these stations, the reinforcements are installed inside the frame, and the tensioning pieces which retain them are positioned.

The frames 201 thus prepared are then taken to tensioning stations 310, provided with appropriate safety devices. This tensioning is effected by tightening the screwing studs located on either side of the frames.

The frames 202 thus prepared and tensioned are then taken to a station 320 for mounting the impressions in the frames, as well as for lubricating the impressions for facilitating subsequent demoulding. It will be noted that, in the example described, the assembly formed by the frame and the impression is in an upturned position with respect to that shown in FIG. 1, i.e. with the opening (the upper face) of the impression directed downwardly. As will, in fact, be seen, the impression is in this position after having been released from the mould. It is precisely impressions from a demoulding station which are taken, for example by a truck 501, up to assembly station 320; the upturned impression is then simply placed on the frame; as seen previously, the respective profiles of the impression and of the frame allow perfect positioning of the two elements by simple contact.

The mould assembly (frame and impression combined) then passes into a station 330 for turning over through 180°, so that the opening of the mould is directed upwardly. The mould is then ready to receive the liquid concrete.

The mould is filled at a casting station 340, supplied with liquid concrete previously prepared by a mixer 350. This casting station is of a type comparable with the one described in Applicants' French Pat. No. 72 20628. It will be particularly noted that, during this operation as during the following one, the frame and the impression are held firmly together by means of hydraulic clipping jaws, so as to complete the tightness, ensured by simple contact as indicated hereinbefore.

The filled mould is then disposed on a vibrating table 360 which ensures ramming of the concrete. This vibrating table is similar to the one described in Applicant's French Pat. No. 79 10058.

The full, rammed moulds are then evacuated by a truck 502 towards one of the storage and curing areas 370. In FIG. 5, five of such areas have been shown, all identical. The moulds are juxtaposed therein, side by side.

Demoulding is effected by a demoulding assembly 380 similar to the one described in Applicants' French Pat. No. 72 21991. Demoulding is effected after the frames have been turned over. The concrete beam therefore rests with its upper face placed on the heating slab, and it is then easy to withdraw the impression from the frame without displacing the latter nor the beam. The removal of the impression from within the confines of the frame leaves an air gap between the longitudinal sides of the frame and the beam being cast. The withdrawn impressions are then returned to the station 320 for re-mounting on the frames, for example by means of a carriage 503.

It will be noted that, even after withdrawal of the impressions, the frames remain juxtaposed, the assembly formed by the frame and the impression combined not occupying any more space in width than the frame alone. It is therefore not necessary to displace the frames after they have been turned over, and all the operations can be carried out at the same spot in the storage area.

A cover unit 390, mounted on a travelling crane 400, then covers all the demoulded beams located in the same storage area with a cover which will allow curing in a confined atmosphere; the storage areas 370 are in fact constituted by heating slabs, heating preferably being ensured by electrical means.

Once curing is effected (about ten hours), a truck 504 evacuates the cured frames, preferably in two's (the frames are, in fact, lighter due to the withdrawal of the impressions). These frames, which retain the dry beams, are taken towards lines 410 awaiting detensioning of the reinforcements, this operation being effected at stations referenced 420. The frames are then separated from the finished beams at stations 430 where the ends of the reinforcements, imprisoned in the concrete, are cut. The empty frames 203 are then returned towards the reinforcement mounting stations 300 for subsequent use.

For their part, the beams are stored on a finishing line 440 before being packed at a station 450 from which they will be evacuated towards a depot by means of a fork lift truck 505.

Of course, the present description, both of the casting assembly and of the process and installation for carrying it out, are given purely by way of indication, and other embodiments or variants may be envisaged without departing from the scope of the present invention.

What is claimed is:

1. Process for manufacturing beams of prestressed reinforced concrete which comprises:

(1) mounting reinforcements longitudinally in an individual prestress frame consisting of two end elements, and two longitudinal elements allowing tensioning of said reinforcements between the two end elements said end elements being maintained in a steady spaced apart relationship with each other by the longitudinal elements, said longitudinal elements being of sufficient strength to avoid buckling or twisting of the frame in use, (2) tensioning the reinforcements by means of screwing studs disposed on the outer surface of the end walls so that tension is maintained in the reinforcements solely by means of the frame, (3) positioning the frame thus prepared on an individual impression to provide a mould for three sides of said beam, said impression being adapted to cooperate hermetically with said frame so that after said frame has been positioned on said impression the walls of the impression and the end walls of the frame, connected together by contact of the corresponding faces together form the sides of a mould for receiving cast concrete, (4) casting concrete into the so-prepared mould, (5) vibrating and ramming the cast concrete in the mould, (6) turning the assembly of impression and frame over so that the upper face of the cast concrete rests on a heating slab, (7) removing the impression so as to leave an air gap around the cast concrete on the three sides that had hitherto contacted said impression while maintaining said reinforcements under tension by means of said frame until said concrete is substantially cured, (8) covering the frame with an insulating cover so that the longitudinal elements and the end elements of the frame and the cover form an individual oven around the case concrete beam confining hot air around exposed faces of the beam so as to cure the concrete, and (9) separating the frame and the finished beam without dismantling said frame so that said frame is immediately available for reuse.

2. The process of claim 1, wherein a plurality of frames are juxtaposed, after the frames and the corresponding impressions have been turned over and the impressions have been withdrawn, such that the cover then covers all the juxtaposed frames.

3. The process of claim 1, wherein the frame and the impression, after having been connected, are held together by hydraulic clipping jaws for the whole duration of the steps of casting, vibrating and ramming the concrete.

* * * * *